United States Patent Office

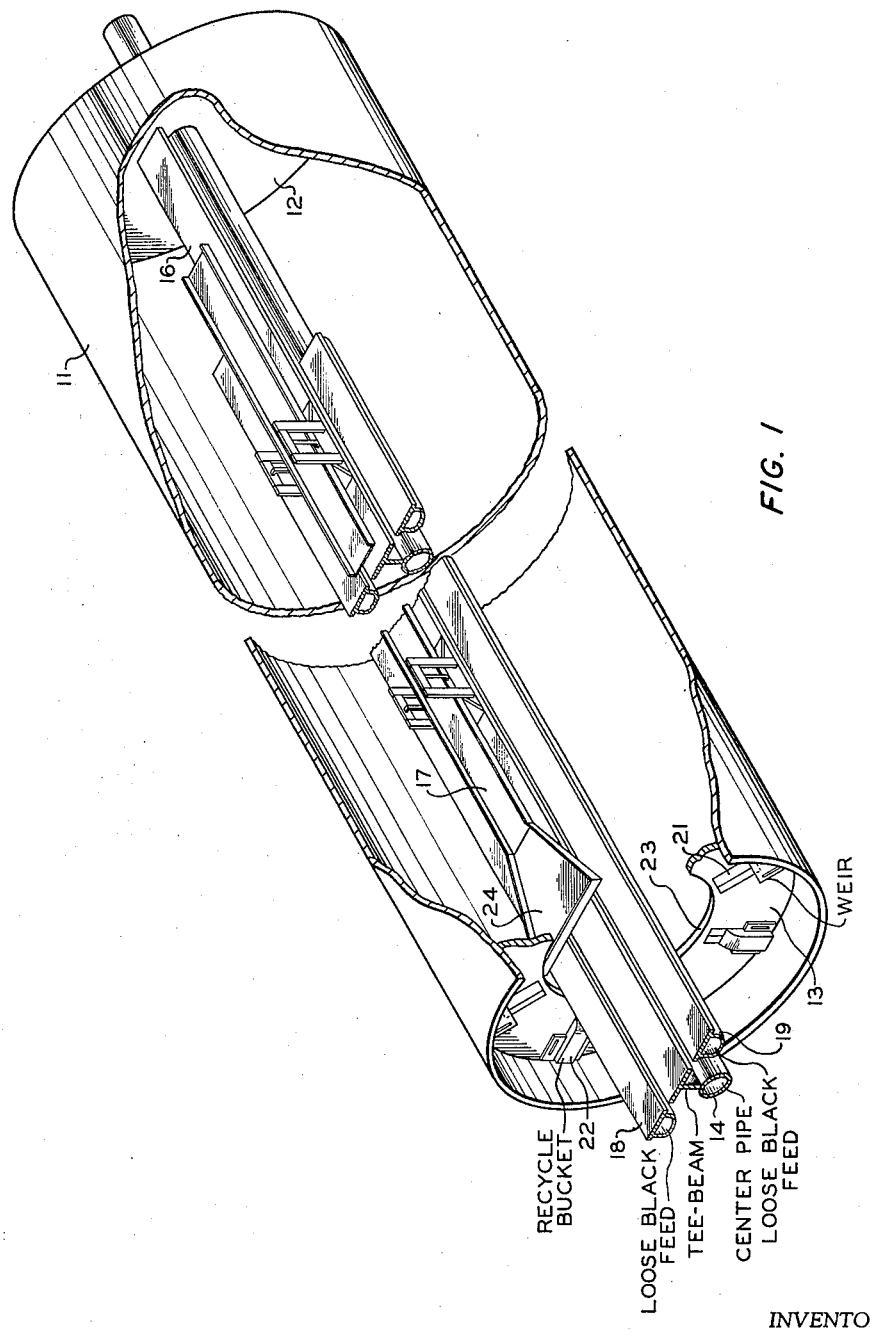

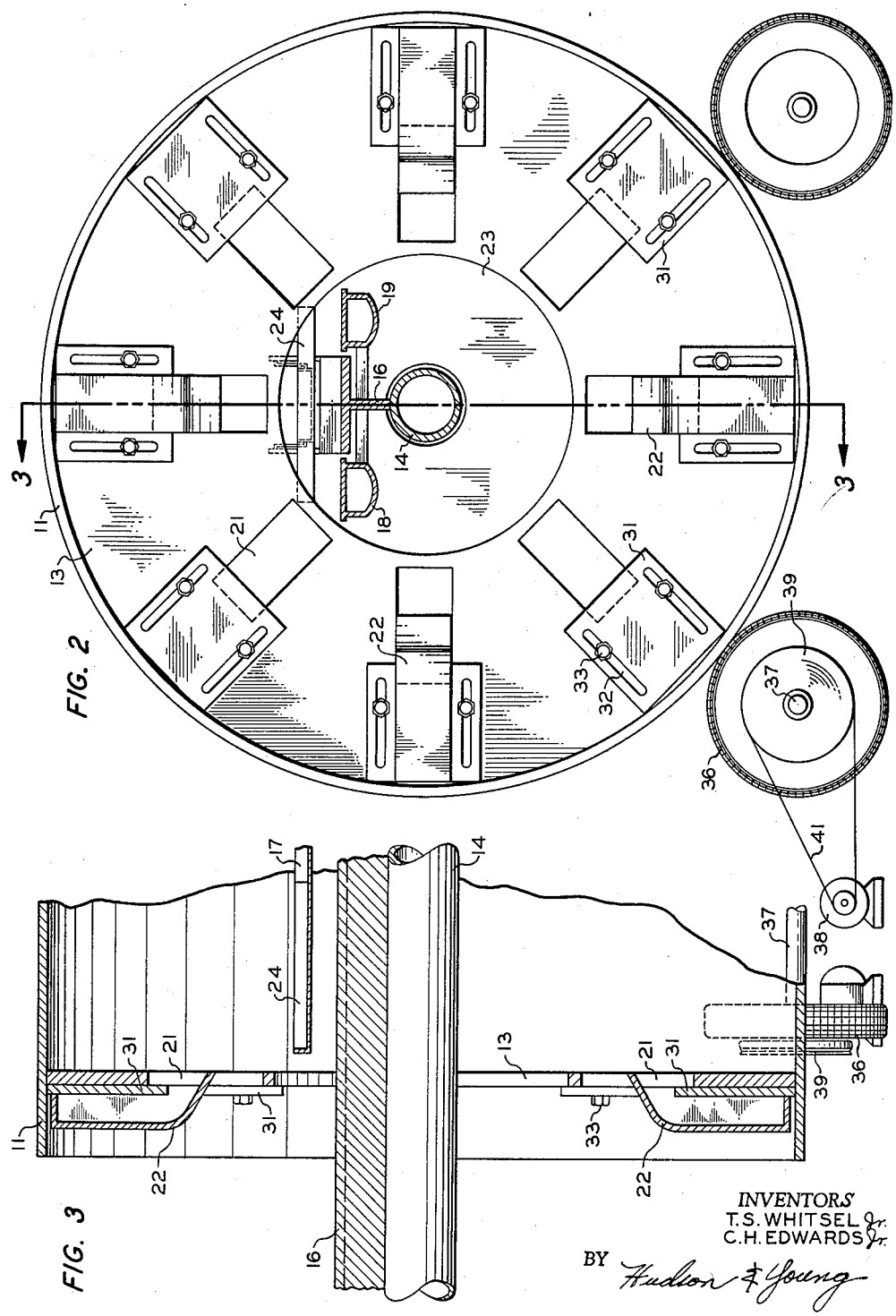

2,921,334
Patented Jan. 19, 1960

2,921,334

APPARATUS FOR PELLETING POWDERED MATERIAL

Travis S. Whitsel, Jr., Borger, Tex., and Clyde H. Edwards, Jr., Cuyahoga Falls, Ohio, assignors to Phillips Petroleum Company, a corporation of Delaware Original application October 16, 1953, Serial No. 386,532. Divided and this application October 21, 1957, Serial No. 691,363

5 Claims. (Cl. 18—1)

This invention relates to an improved apparatus for pelleting powdered pelletable materials. A specific aspect of the invention is concerned with pelleting loose carbon black.

This application is a division of our copending U.S. application Serial No. 386,532, filed October 16, 1953.

It is conventional to pellet various powdered materials such as clay, aluminum oxide, and other metal oxides for catalytic uses, and, particularly, carbon black, by subjecting the material to a rolling action in horizontally elongated, cylindrical drums. The loose powdered material is delivered to the pelleting drum, or mill, at one end thereof and passes through the mill to the opposite end where it is recovered as it passes over weirs or through openings disposed at a predetermined distance from the periphery of the mill. In this manner, the weirs or openings rotate with the drum and, when in the lower portion of their arc of rotation, tend to regulate the depth of the pellets in the delivery end of the drum by permitting the pellets in the pellet bed in the mill standing above the level of the weir or opening to pass out the end of the mill and be recovered as products of the pelleting process.

It has been found particularly advantageous to recycle a substantial portion of the pellets from the delivery end to the feed end of the mill and this is conventionally done by apportioning a part of the effluent product stream to the feed end of the mill by a series of conveyors. This method of recycle is not particularly economical of equipment and continually breaks up a substantial portion of the recycled pellets in the process of transfer from the product end of the mill to the feed end thereof.

The principal object of the invention is to provide an improved apparatus for recycling pellets in a pelleting process involving rolling of powdered material in a cylindrical mill so as to form pellets. Another object of the invention is to provide an improved apparatus for pelleting powdered materials. A further object of the invention is to provide apparatus for recycling carbon black pellets to a pelleting process effected by rolling the powdered material, which avoids breaking any appreciable quantity of the pellets being recyced. Other objects of the invention will become apparent from a consideration of the accompanying disclosure.

We have devised apparatus which is particularly effective in recycling pellets from the discharge end of a pelleting mill to the feed end which avoids destruction of the pellets being recycled and which apparatus is simple and economical of construction. The apparatus involved receives a specific, readily adjustable proportion of the effluent pellets from the delivery end of the mill and returns them by means of an internal recycle conveyor to the feed end of the mill. One or more buckets are attached to the end plate of the mill through which the finished pellets are delivered so as to cover at least the radially outer portion of the openings in the end plate in order to receive and hold the pellets delivered through that particular opening covered by the bucket. As the mill is revolved, the trapped pellets are delivered back into the mill when the bucket is inverted in the upper portion of its arc of rotation. The trapped pellets are received on an internal recycle conveyor which extends from the delivery end plate of the mill to the feed end of the mill. In this manner, a predetermined proportion of the pellets delivered through the end plate of the mill is trapped in the recycle buckets and delivered, as the mill rotates, to the internal recycle conveyor for return to the feed end of the mill. In this manner, the buckets, in combination with the mill end plate, function as a rotary bucket elevator in picking up or receiving pellets at the lower portion of their arc of rotation and deliver the same back into the mill at the top of the arc of rotation.

A more complete understanding of the invention may be had by referring to the drawing, in which:

Figure 1 is an isometric view of a pellet mill utilizing one embodiment of the invention;

Figure 2 is an end elevation of the delivery end of a pellet mill illustrating one embodiment of the invention; and Figure 3 is a partial cross-section of the end of the mill shown in Figure 2, taken along the line 2—2.

Referring to Figure 1, the apparatus shown includes a cylindrical mill, or drum, 11 having feed end closure plate 12 and delivery end plate 13. Extending along the axis of the mill is a center support pipe 14 which rests on supporting columns (not shown) outside of the mill. This supporting pipe supports a scraper (not shown) adapted to remove carbon black which becomes attached to the mill wall and prevents caking and disruption of the pelleting process from large pieces of caked carbon black coming off the wall of the mill and destroying the pellets. Pipe 14 also supports I-beam 16, which in turn supports internal recycle conveyor 17 and which may also support loose-black conveyors 18 and 19. These conveyors may also be supported by pipe 14 directly. Conveyor 18 extends to a point closer to the feed end of the mill than does conveyor 19 so that the loose black fed to the mill is delivered at different points. This manner of delivery has been found to improve the pelleting process. Recycle conveyor 17 extends to a point closer to the feed end of the mill than does either of the feed conveyors because it has been found that this technique also improves the pelleting process.

The end plate of the mill (plate 13) contains a series of uniformly spaced, rectangular openings 21 which are equally spaced from the periphery of the plate so that a uniform amount of pellets is delivered through each of the openings as the mill revolves and to regulate the depth of the pellet bed in the delivery end of the mill. In a large mill 8' in diameter by 48' long, rectangular openings 21 are disposed at a distance of 12–20" from the periphery of the end plate so as to permit operation with a pellet bed depth in that range. Adjustability of the depth of the bed without replacing the end plate of the mill may be provided for by slidable weirs in combination with the rectangular openings which will be described in connection with Figures 2 and 3. Fastened to end plate 13 are one or more buckets 22 which cover all, or at least the radially outermost portion, of the openings in the end plate so as to receive and trap pellets which pass through the openings which the bucket covers. The buckets shown in Figure 1 cover the entire opening with which they are associated and extend radially inwardly toward the center of the end plate, or the axis of the mill, into the open space 23 of the end plate. The side of the bucket 22 opposite end plate 13 is designed so as to curve back at least to the plane of the end plate and thereby, when in inverted position, deliver the trapped pellets back into the mill. Opening 23 in end plate 13 is essential to the apparatus when supporting the internal elements of the mill by means of a center pipe such as center pipe 14, and particularly when the loose black is fed into the mill through the delivery end thereof in the manner shown. In this manner, opening 23 in end plate 13 permits rotation of the mill without interference from elements 14, 16, 18, and 19.

In mills of a design using introduction of loose black through the forward end of the mill, end plate 13 may eliminate open space 23 therein, in which case buckets 22 must be designed so as to pass pellets back into the mill through the delivery opening or through an auxiliary opening specially provided for this purpose.

Recycle conveyor 17 has a flared receiving member 24 which is disposed sufficiently close to the inside surface of end plate 13, or the plane thereof, to catch the recycled pellets without permitting them to fall between the receiving section and the end of the mill. Conveyor 17 is preferably a vibratory, oscillating, or shaker conveyor which is readily available on the market, or a belt or screw-type conveyor, or any other type of conveyor may be utilized which receives pellets from the delivery end of the mill by means of the rotary bucket conveyor in the mill end and delivers them to the feed end of the mill without material destruction of pellets. In view of the fact that the temperature within a carbon black pelleting mill is frequently in the range of 250–400° F., the particular recycle conveyor selected must be operable without rapid deterioration under these temperature conditions.

Referring to Figure 2, the parts or elements corresponding to those in Figure 1 are identified with the same numerals as those used in that figure. This end view of the mill shows an embodiment of the invention utilizing eight mill end openings 21 which are partially covered by adjustable weirs 31 containing slots 32 through which bolts or cap screws 33 extend into the end of the mill and affix the weirs thereto. This arrangement provides for adjusting of the position of the weir over the opening so as to control the depth of the pellet bed in the mill. The arrangement shown utilizes an equal number of open and bucket-covered openings which provides for the recycling of approximately 50 percent of the pellets delivered through the mill end. Buckets 22 in this embodiment cover only the lower portion of the opening when the same is in its lowermost position during rotation and therefore feed pellets back into the mill through the outlet opening. In the embodiment shown, buckets 22 extend to the cylindrical mill wall 11; they may be designed to extend only a substantial portion of the distance from the radially outermost edge of the opening to the periphery of the mill. In any instance, the bucket should provide a deep enough pocket when in receiving position at the bottom of its arc of rotation to receive and hold all of the pellets delivered through the opening so that the calculated amount of recycle will be effected.

The type of mill shown in the drawing is supported and rotated by two sets of wheels 36 revolving on a pair of shafts 37 which are disposed parallel to the axis of the mill. Each shaft carries as many wheels as are necessary to adequately support the mill throughout its length. Rotation of the mill is effected by means of motor 38 which is connected with pulley, or driven wheel, 39 on shaft 37 by means of a belt, or drive chain, 41. In conventional operation, power is applied to only one shaft in the assembly. One type of mill utilizes inflated automobile tires, mounted on conventional wheels, as supporting wheels 36. Another type of mill utilizes flat, steel-rimmed wheels which contact wide metal bands on the outside of the drum on which they operate as a track. These elements are not part of the invention and need no further description.

Figure 3 provides a more complete understanding of the recycle buckets by showing a cross-section of the buckets of Figure 2. It can be seen that the outer side of the bucket opposite the end plate curves back obliquely to the inside plane of the end plate so as to deliver the pellets inside the mill and direct the path of the pellets obliquely toward the axis of the mill, thereby assuring delivery of the pellets onto the receiving end of the recycle conveyor.

The particular bucket design shown in Figures 2 and 3 utilizes a three-sided bucket, the weir 31 serving as the side of the bucket adjacent the end plate. In this design the bucket is welded directly to the weir; however, other means of fastening the buckets to the weirs, or directly to the end plate where weirs are not utilized, are feasible. The buckets may have flanges, or ears, fastened thereto, or integral therewith, through which fastening means such as bolts or cap screws may extend into the end of the mill. Buckets fabricated of ten gauge carbon steel in accordance with the design shown in Figures 2 and 3 have been found to be appropriate and serviceable in the type of mill shown in the drawing.

The delivery end of the mill is enclosed with a hood (not shown) which has an inspection door therein for observation and adjustment of the weirs and buckets. The hood terminates, on its lower side, in a hopper for recovering product pellets and directing their flow to a conveyor which leads to an elevator for delivering the product pellets to storage and/or packaging. It is essential to house or enclose the conveyors in order to prevent escape of loose black in the form of dust. The internal recycle conveyor eliminates this problem as far as the recycle conveyor is concerned.

The invention has been successfully operated in conjunction with a mill 8 ft. in diameter and 48 ft. long utilizing 8 delivery openings with weirs positioned at a bed depth of 14". Four of the delivery openings (alternate) were partially covered by recycle buckets so as to provide for recycling of one-half of the delivered pellets. The mill end plate was of the design shown in Figures 2 and 3.

Advantages of the invention were found to be: (1) the buckets being mounted outside of the bed section of the mill avoided destruction of pellets from protrusion of obstructions into the mill, (2) the buckets were readily accessible for maintenance from the hood inspection door, (3) the amount of recycle pellets was readily controllable by varying the number of buckets or by restricting the bucket opening, (4) installation of the invention was made without extensive redesigning of the mill, (5) the destruction of pellets recycled was reduced to a minimum, and (6) the problem of dust in the external recycle conveyor was eliminated.

Numerous modifications of the invention can be made within the scope of the preceding disclosure. It should be realized that the illustrative details set forth herein are merely explanatory and should not be construed as unnecessarily limiting the invention.

We claim:

1. Pelleting apparatus comprising an elongated rotatable cylindrical pellet mill adapted to be positioned so that the axis thereof is in a generally horizontal plane; means for rotating said mill about its axis; an end plate attached to the outlet end of said mill, said end plate having a series of spaced openings therein substantially equidistant from the axis of said mill; at least one pellet transfer bucket attached to the outside of said end plate and disposed over at least that portion of one of said openings nearest the circumference of said end plate, said bucket being open only on the side adjacent the opening which it covers so as to provide for passage of pellets to said bucket through said opening when same is opposite a bed of pellets in the bottom of said mill and for delivery of said pellets back into said mill when said bucket is rotated to a position adjacent the top of its arc of rotation; an internal recycle conveyor disposed in said mill, the receiving end of said conveyor being disposed to receive pellets delivered back into said mill from said bucket, the discharge end of said conveyor being disposed adjacent the inlet end of said mill; and means for delivering material to be pelleted to said inlet end of said mill.

2. The apparatus of claim 1 wherein said conveyor is an oscillating-type conveyor.

3. Pelleting apparatus comprising an elongated rotatable cylindrical pellet mill adapted to be positioned so that the axis thereof is in a generally horizontal plane; means for rotating said mill about its axis; at least one pellet transfer bucket secured to said mill adjacent the outlet end thereof to receive pellets when said bucket is disposed within a bed of pellets in the bottom of said mill and to deliver said pellets back into said mill when said bucket is rotated to a position adjacent the top of its arc of rotation; an internal recycle conveyor disposed in said mill, the receiving end of said conveyor being disposed to receive pellets delivered back into said mill from said bucket, the discharge end of said conveyor being disposed adjacent the inlet end of said mill; and means for delivering material to be pelleted to said inlet end of said mill.

4. Pelleting apparatus comprising an elongated rotatable cylindrical pellet mill adapted to be positioned so that the axis thereof is in a generally horizontal plane; means for rotating said mill about its axis; a circular end plate attached to the outlet end of said mill, said end plate having a series of spaced-apart openings therein disposed intermediate the center and the circumference of said plate substantially equidistant from said center, and at least one pellet transfer bucket attached to the outside of said end plate and disposed over at least that portion of one of said openings nearest the circumference of said plate, said bucket being open only on the side adjacent the opening which it covers so as to provide for passage of pellets to said bucket through said opening when same is opposite the end of a bed of pellets in the lower portion of said mill and for delivery of said pellets back into said mill when said bucket is rotated to a position adjacent the top of its arc of rotation, said bucket extending a substantial portion of the distance between said opening and the circumference of said end-plate so as to form a pocket for said pellets; an internal recycle conveyor disposed in said mill, the receiving end of said conveyor being disposed to receive pellets delivered back into said mill from said bucket, the discharge end of said conveyor being disposed adjacent the inlet end of said mill; and means for delivering material to be pelleted to said inlet end of said mill.

5. The apparatus of claim 4 including an adjustable weir attached to each of said plates at said openings, said weirs being slidably adjustable radially relative to said plate so as to provide for regulation of the depth of the bed of pellets by varying the level at which pellets are delivered over said weirs, said bucket being superimposed on the weir with which it functions.

References Cited in the file of this patent
UNITED STATES PATENTS

| | | |
|---|---|---|
| 1,980,130 | Fasting | Nov. 6, 1934 |
| 2,711,557 | Russell | June 28, 1955 |
| 2,786,232 | Larson et al. | Mar. 26, 1957 |